US005559835A

United States Patent [19]
Betts

[11] Patent Number: 5,559,835
[45] Date of Patent: Sep. 24, 1996

[54] METHOD AND APPARATUS FOR ENCODING DATA FOR TRANSFER OVER A COMMUNICATION CHANNEL

[75] Inventor: William L. Betts, St. Petersburg, Fla.

[73] Assignee: Lucent Technologies Inc., Murray Hill, N.J.

[21] Appl. No.: 391,328

[22] Filed: Feb. 21, 1995

Related U.S. Application Data

[63] Continuation of Ser. No. 93,508, Jul. 16, 1993, abandoned.
[51] Int. Cl.$^6$ .................................................. H04B 15/00
[52] U.S. Cl. ........................ 375/265; 375/298; 371/43
[58] Field of Search ...................... 375/265, 263, 375/264, 266, 269, 290, 298; 371/43; 332/103

[56] References Cited

U.S. PATENT DOCUMENTS

| | | | |
|---|---|---|---|
| 4,941,154 | 7/1990 | Wei | 371/43 |
| 5,022,053 | 6/1991 | Chung et al. | 375/39 |
| 5,040,191 | 8/1991 | Forney, Jr. et al. | 371/43 |
| 5,159,610 | 10/1992 | Eyuboglu et al. | 375/18 |
| 5,162,812 | 11/1992 | Aman et al. | 375/34 |
| 5,195,107 | 3/1993 | Wei | 375/18 |
| 5,249,200 | 9/1993 | Chen et al. | 375/58 |
| 5,265,127 | 11/1993 | Betts et al. | 375/39 |

FOREIGN PATENT DOCUMENTS 2652692  4/1991  France .

OTHER PUBLICATIONS

Telecommunications Industry Association, Paper TR–30–.1/ 93–04–14, "Implementation of precoding in V.fast" by Vedat Eyuboglu, et al, General DataComm Inc., Motorola Codex, Rockwell International, Atlanta, Ga., 15 Apr. 1993.

Telecommunications Industry Association, Paper TR–30.1/ 93–06 23, "ISI Coder–Combined Coding & Precoding" Rajiv Laroia, AT&T, Baltimore, Md., 14–18 Jun., 1993.

CCITT, Paper 989–1992, "Trellis precoding vs. linear pre- –emphasis: test results", Motorola Information Systems, Baltimore, Md., Jul. 31–Aug. 2, 1991.

International Telecommunications Union, Telecommunications Standards Sector (ITU–TSS), Period 1993–96, "4D codes for V.fast", Motorola Information Systems, Rockville, Md., May 12–14, 1993.

European Search Report dated Apr. 11, 1995, regarding EPO Application No. 94 30 4979.

European Transactions On Telecommunications and Related Technologies, May–Jun. 1993, Italy, vol. 4, No. 3, pp. 243–256. "Advanced Modulation Techniques For V.Fast"; M. V. Eyuboglu, et al.

Primary Examiner—Wellington Chin
Assistant Examiner—Timothy J. May
Attorney, Agent, or Firm—Christopher N. Malvone

[57] ABSTRACT

In a system that uses a dither signal in the production of a transmitted signal, the recoverability of an original trellis code is maintained while forming the dither signal using a modulo value that is equal to the distance between two adjacent symbols. This is accomplished by forming individual modulo counts for each of the orthogonal components produced by the transmitter's 3-tap FIR filter. The modulo counts and the bits from the trellis encoder are used to substitute the constellation subset identified by the trellis encoder with another constellation subset. The substituted subset is used for transmission and results in recovery of the original trellis code by the trellis decoder in the receiver.

30 Claims, 12 Drawing Sheets

FIG. 4

8-WAY PARTITION OF A 2D CONSTELLATION

```
d    a    D  |  A    d    a      5*2⁻ᵐ
```
$5 \cdot 2^{-m}$

| | | | | | | |
|---|---|---|---|---|---|---|
| d | a | D | A | d | a | $5*2^{-m}$ |
| c | b | C | B | c | b | $3*2^{-m}$ |
| D | A | d | a | D | A | $2^{-m}$ |
| C | B | c | b | C | B | $-2^{-m}$ |
| d | a | D | A | d | a | $-3*2^{-m}$ |
| c | b | C | B | c | b | $-5*2^{-m}$ |

TABLE 1: LABELS OF 4D SUBSETS

| $Y_0Y_1Y_2$ | $Y_3Y_4Y_5$ | | | | | | | |
|---|---|---|---|---|---|---|---|---|
| | 000 | 001 | 010 | 011 | 100 | 101 | 110 | 111 |
| 000 | aa | AA | aA | Aa | cc | CC | cC | Cc |
| 001 | bb | BB | bB | Bb | dd | DD | dD | Dd |
| 010 | ac | AC | aC | Ac | ca | CA | cA | Ca |
| 011 | bd | BD | bD | Bd | db | DB | dB | Db |
| 100 | ab | AB | aB | Ab | cd | CD | cD | Cd |
| 101 | bc | BC | bC | Bc | da | DA | dA | Da |
| 110 | ad | AD | aD | Ad | cb | CB | cB | Cb |
| 111 | ba | BA | bA | Ba | dc | DC | dC | Dc |

64-STATE WEI CODE

16-STATE WEI CODE

FIG. 8

SUBSET CONVERSION TABLE, 8-WAY PARTITIONS

| MODULO COUNT | | ORIGINAL SUBSETS | | | | | | | |
|---|---|---|---|---|---|---|---|---|---|
| X CNT | Y CNT | a | b | c | d | A | B | C | D |
| 00 | 00 | a | b | c | d | A | B | C | D |
| 00 | 01 | b | A | D | c | B | a | d | C |
| 00 | 10 | A | B | C | D | a | b | c | d |
| 00 | 11 | B | a | d | C | b | A | D | c |
| 01 | 00 | d | c | B | A | D | C | b | a |
| 01 | 01 | c | D | a | B | C | d | A | b |
| 01 | 10 | D | C | b | a | d | c | B | A |
| 01 | 11 | C | d | A | b | c | D | a | B |
| 10 | 00 | A | B | C | D | a | b | c | d |
| 10 | 01 | B | a | d | C | b | A | D | c |
| 10 | 10 | a | b | c | d | A | B | C | D |
| 10 | 11 | b | A | D | c | B | a | d | C |
| 11 | 00 | D | C | b | a | d | c | B | A |
| 11 | 01 | C | d | A | b | c | D | a | B |
| 11 | 10 | d | c | B | A | D | C | b | a |
| 11 | 11 | c | D | a | B | C | d | A | b | g = 20 g = 40 g = 60

METHOD AND APPARATUS FOR ENCODING DATA FOR TRANSFER OVER A COMMUNICATION CHANNEL

This application is a continuation of application Ser. No. 08/093,508, filed on Jul. 16, 1993 now abandoned.

CROSS-REFERENCE TO RELATED APPLICATIONS

Related subject matter is disclosed in the applications assigned to the same assignee hereof identified as Ser. No. 08/076,603, filed Jun. 14, 1993, entitled "Intersymbol Interference Channel Coding Scheme" and Ser. No. 08/141,301, filed Oct. 22, 1993, entitled "A Method and Apparatus for Adaptively Providing Precoding and Preemphasis Conditioning to Signal Data for Transfer Over a Communication Channel".

FIELD OF THE INVENTION

The invention relates to encoding data for transfer over a communication channel; more specifically, communicating data over a telephone communication channel which is susceptible to inter-symbol interference.

DESCRIPTION OF THE RELATED ART

U.S. Pat. No. 5,162,812, entitled "Technique for Achieving the Full Coding Gain of Encoded Digital Signals", discloses a system in which a transmitted signal is encoded using a trellis code and precoded using a generalized partial response filter. FIG. 1 illustrates the transmitter disclosed in the aforementioned U.S. Patent. Serial-to-parallel converter 10 converts the incoming data to parallel words. Trellis encoder 12 encodes the parallel word to provide increased immunity to inter-symbol interference. Symbol mapper 14 maps the trellis encoded word to a signal point in a predefined symbol or signal point constellation. The symbol specified by symbol mapper 14 is in the form of a complex number which is received by precoding unit 16. Precoding unit 16 is used to compensate for signal distortions that are introduced at a receiver when the receiver passed the symbol through a noise whitening filter. Received symbols are passed through a noise whitening filter to compensate for the communication channel's colored noise and thereby improve proper decoding of the trellis code. Precoder 16 includes transversal filter 18 and non-linear filter 20. Non-linear filter 20 is in the form of a modulo device that repeatedly subtracts or adds a value of 2 L until the output $\alpha$ of the device satisfies $-L \leq \alpha \leq L$. Non-linear filter 20 is used to compensate for any instability introduced by filter 18. The output of encoder 16 is modulated by modulator 19 using a modulation technique such as QAM (quadrature amplitude modulation). The output of modulator 19 is filtered by filter 20, passed through hybrid 22, and then out to local telephone loop 24.

A similar system is disclosed in a paper presented to Technical Committee TR-30 of the Telecommunications Industry Association (TIA) in Atlanta, Ga. on Apr. 15, 1993. The paper is entitled "Implementation of Precoding in V-FAST" authored by Eyuboglu et al. FIG. 2 illustrates the precoder disclosed in the paper. Precoder 30 is similar to precoder 16. In this embodiment both the FIR filter and the modulo device are in the feedback loop. The FIR filter is disclosed as a 3-tap filter and the output of the modulo device is subtracted from the input to the precoder.

Both of the aforementioned systems precode the data so that there is compensation for the effects of the noise whitening filter in the receiver. Unfortunately, both systems have drawbacks. The first system is only useful for square symbol constellations and thereby prevents using more efficient constellations. The second system uses a relatively large dither signal. The large dither signal varies transmitted signal power by a relatively large amount that may exceed the maximum allowable power for the communication channel. As a result, the amount of signal space allotted to the constellation must be decreased to accommodate the variations in transmitted power. Decreasing the constellation's signal space decreases the space between signal points in the constellation and decreases noise immunity.

SUMMARY OF THE INVENTION

The present invention is not limited to square constellations and it decreases the amplitude of the dither signal. The dither signal is decreased by using a smaller modulo value to generate the dither signal while maintaining the ability to recover the original trellis code in the receiver. The recoverability of the original trellis code is achieved by using a modulo count, which was formed while producing the dither signal, to select a substitute constellation subset for the constellation subset identified by the trellis encoder.

BRIEF DESCRIPTION OF THE DRAWING

FIG. 4 illustrates a symbol or signal point constellation;

FIG. 7 is a subset selection table;

FIG. 8 is a subset substitution table;

DESCRIPTION OF THE PREFERRED EMBODIMENT

Figure 1:
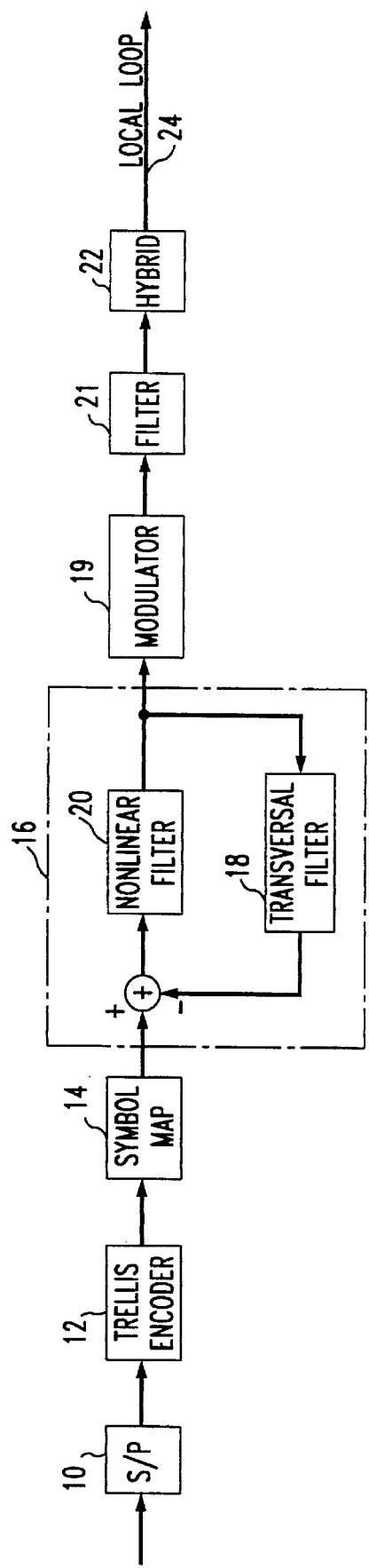
FIG. 1 illustrates a prior art transmitter.
Figure 2:
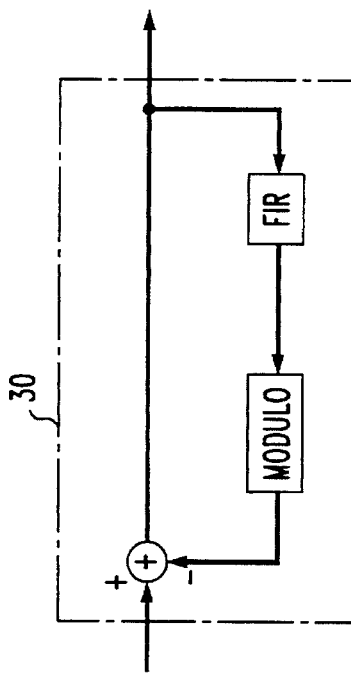
FIG. 2 illustrates a precoder used in a transmitter.
Figure 3:
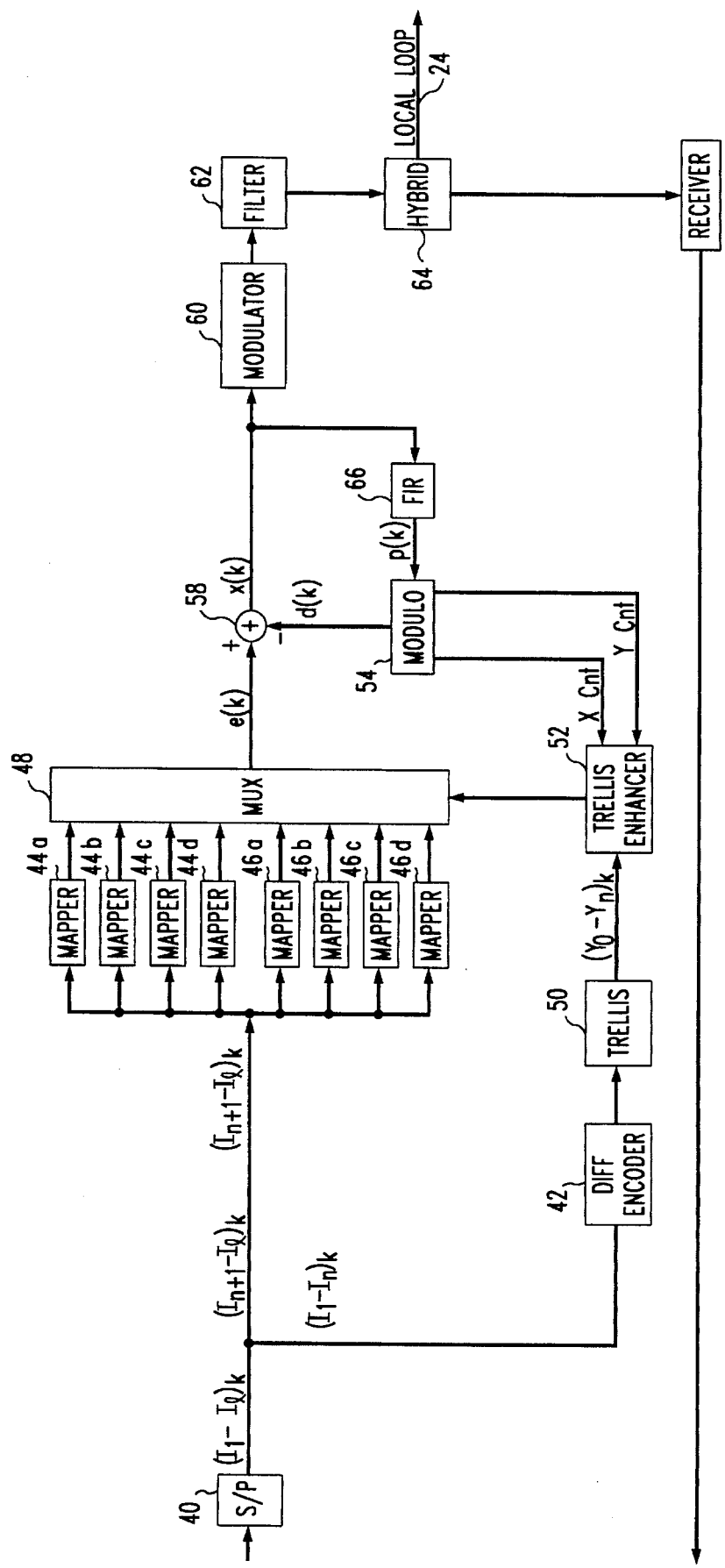
FIG. 3 illustrates the transmitter section of one embodiment of the present invention.

FIG. 3 illustrates the transmitter section of one embodiment of the present invention. Serial data is received by serial-to-parallel converter 40. The output of serial-to-parallel converter 40 is an L-bit word. Bits 1 to n are sent to differential encoder 42, and the remaining n+1 to L bits are sent to symbol mappers 44a, 44b, 44c, 44d, and 46a, 46b, 46c and 46d. Bits n+1 to L are mapped into different signal point or symbol constellation subsets by the mappers. Taken together, the subsets comprise the overall transmit constellation. The output of each mapper is a complex number with orthogonal components. The complex number identifies a symbol in a symbol constellation subset. The outputs from mappers are received by mux 48.

Differential encoder 42 differentially encodes some of bits 1 through n. Differentially encoded bits, as well as the unchanged data bits, are passed to trellis encoder 50. Trellis encoder 50 produces trellis bits $Y_0$ through $Y_n$. Bits $Y_0$ through $Y_n$ are received by trellis enhancer 52. Trellis enhancer 52 also receives inputs x-count and y-count from modulo device 54. Based on the values $Y_0-Y_n$, and the values of x-count and y-count, trellis enhanced controls mux 48 to select one of the mapper outputs. The output of mux 48, signal e(k), is received by summer 58. Dither signal d(k) from modulo device 54 is subtracted from signal e(k) in summer 58. The output of summer 58, signal x(k), is fed to modulator 60, passband filter 62 and hybrid 64. The output of summer 58 is also fed to three-tap finite impulse response (FIR) filter 66. The output of filter 66 is received by modulo device 54 to produce outputs x-count, y-count and d(k).

During each symbol period, serial-to-parallel converter 40 produces parallel word $(I_1-I_L)_k$. Bits $I_{n+1}-I_L$ are passed to the mappers. The mappers output a signal point or symbol in a predefined constellation subset based on bits $I_{n+1}-I_L$. FIG. 4 illustrates an 8-way partitioned symbol constellation. Bits $I_1-I_L$ are encoded as one of the symbols in the constellation. The constellation shows that there are eight constellation subsets making up the overall constellation. The subsets consist of signal points labeled a, b, c, d, A, B, C and D, where like letters belong to the same subset. In a 4-way partitioned constellation where there are four subsets, the upper and lower case form of each letter is considered part of the same subset. Data bits $I_1$ through $I_n$ and a trellis bit are used to select one of the eight subsets. Data bits $I_{n+1}$ through $I_L$ are used to identify a particular symbol or signal point within the subset.

Differential encoder 42 and trellis encoder 50 use bits $I_1-I_n$ to choose a constellation subset. In this embodiment n=5; however, it may have other values. Differential encoder 40 differentially encodes bits $I_2-I_3$ in accordance with the differential encoding table to produce bits $J_2$ and $J_3$.

Differential Encoding

| Inputs | | Previous Outputs | | Outputs | |
|---|---|---|---|---|---|
| $I_2$ | $I_3$ | $J_2'$ | $J_3'$ | $J_2$ | $J_3$ |
| 0 | 0 | 0 | 0 | 0 | 1 |
| 0 | 0 | 0 | 1 | 1 | 1 |
| 0 | 0 | 1 | 0 | 0 | 0 |
| 0 | 0 | 1 | 1 | 1 | 0 |
| 0 | 1 | 0 | 0 | 0 | 0 |
| 0 | 1 | 0 | 1 | 0 | 1 |
| 0 | 1 | 1 | 0 | 1 | 0 |
| 0 | 1 | 1 | 1 | 1 | 1 |
| 1 | 0 | 0 | 0 | 1 | 1 |
| 1 | 0 | 0 | 1 | 1 | 0 |
| 1 | 0 | 1 | 0 | 0 | 1 |
| 1 | 0 | 1 | 1 | 0 | 0 |
| 1 | 1 | 0 | 0 | 1 | 0 |
| 1 | 1 | 0 | 1 | 0 | 0 |
| 1 | 1 | 1 | 0 | 1 | 1 |
| 1 | 1 | 1 | 1 | 0 | 1 |

Figure 5:
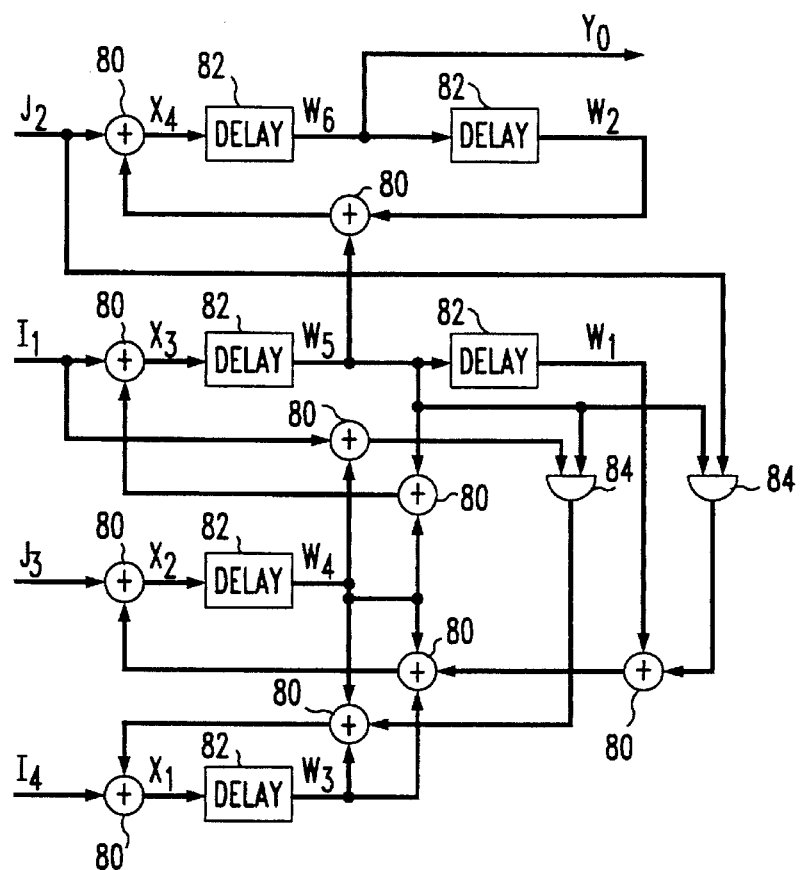
FIG. 5 illustrates a state machine with 64 states.
Figure 6:
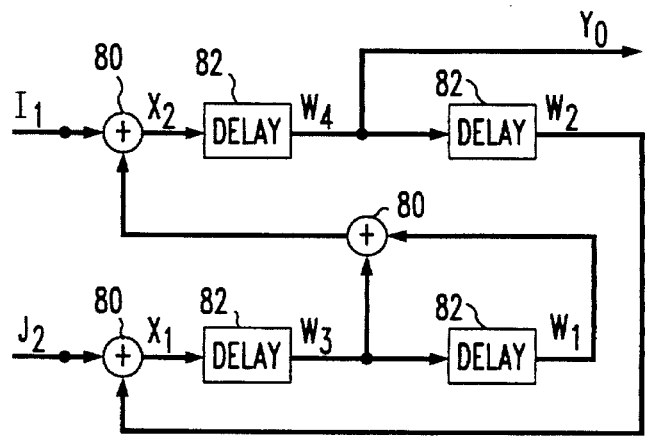
FIG. 6 illustrates a state machine with 16 states.

Bits $I_1$, $J_2$, $J_3$, $I_4$ and $I_5$ are fed to trellis encoder 50. Trellis encoder 50 can be any finite state machine. These types of state machines are well known in the art and two such state machines are shown in FIGS. 5 and 6. The state machine of FIG. 5 is a 64-state machine and the state machine of FIG. 6 is a 16-state machine. State machines with other numbers of states may be used. In the case of the 64-state machine, bits $J_2$, $I_1$, $J_3$ and $I_4$ are used as inputs. The outputs of the state machine are bits $Y_0-Y_5$, where bits $Y_1-Y_5$ equal bits $I_1$, $J_2$, $J_3$, $I_4$ and $I_5$, respectively. The devices labeled 80 are adders and the devices labeled 82 are delays. Bits $Y_0-Y_5$ are used to identify constellation subsets that are used with remaining bits $I_{n+1}-I_L$. The state machines of FIGS. 5 and 6 are used to output a new $Y_0$ bit every symbol period for two-dimensional trellis encoding, and every other symbol period for 4-dimensional encoding. If a new set of outputs is produced each symbol period, delay elements 82 act as a one-symbol period delay, and if a new output is produced every other symbol period, elements 82 act as two symbol period delays. When used to produce a new set of outputs $Y_0$ through $Y_5$ every two symbol periods, the selection of subsets is shown in Table 1 of FIG. 7. The Table illustrates which constellation subsets will be used during the two symbol periods. The first letter identifies the constellation subset used during the first symbol period, and the second letter identifies the constellation subset used during the second symbol period. (If two-dimensional encoding is used, only the first letter is used.) For example, if $Y_0$ through $Y_5$ equal 000010, bits $(I_{n+1}-I_L)_{k-1}$ will be encoded using constellation subset "a" and bits $(I_{n+1}-I_L)_k$ will be encoded using constellation subset "A".

If a constellation with a 4-way partition is used, the 16-state machine of FIG. 6 is used to produce bits $Y_0-Y_3$. (In this case, n=3), where bits $Y_1$, $Y_2$ and $Y_3$ equal bits $I_1$, $J_2$ and $J_3$, respectively. Table 1 is used with $Y_4$ and $Y_5$ set equal to 0, and with lower and upper case forms of the same letter belonging to the same constellation subset.

It is also possible to practice the present invention without the use of the encoders of FIGS. 5 or 6. In this case, n=2 and bits $I_1$ and $I_2$ are fed to the differential encoder. the $J_2$ and $J_3$ bits from the differential encoder are used as bits $Y_2$ and $Y_3$. In this embodiment, two-dimensional coding is used and the differential encoder produces a new output for each symbol period. Table 1 is used with $Y_0$, $Y_1$, $Y_4$ and $Y_5$ set equal to 0, and with the second letter in each table entry ignored.

Returning to the case of an 8-way partitioned constellation, mappers 44a through 44d, and 46a through 46d, identify a symbol in constellation subsets a, b, c, d and A, B, C, D, respectively, based on bits $I_{n+1}-I_L$. The desired mapper output is selected using mux 48 which is controlled by trellis enhancer 52.

Trellis enhancer 52 substitutes the constellation subset identified by Table 1 and bits $Y_0$ through $Y_n$ (in this example n=5), based on the value of x-cnt and y-cnt from modulo device 54. Table 2 of FIG. 8 illustrates the subset substitutions. Trellis enhancer 52 operates mux 48 in accordance with Table 2 so that the proper substitution occurs. The output of mux 48 is received by summer 58.

Before trellis enhancer 52 substitutes a constellation subset for the one identified by bits $Y_0-Y_n$, FIR filter 66 computes output p(k) based on its memory of past transmitted symbols (in the case of a 3-tap filter, the past three symbols). FIR filter 66 is a 3-tap filter that is well known in the art. Coefficients for the filter are obtained during training in a manner well known in the art and specified by standards committees such as the ITU (International Telecommunication Union, formerly the CCITT) in ITU Recommendation V.32 bis. The output of the FIR filter is received by modulo device 54. Modulo device 54 performs a modulo operation on each of the orthogonal components of the symbol to produce a separate modulo count, x-cnt and y-cnt, for the X and Y orthogonal components of filter 68's output. If the output of the FIR filter is positive and greater than $2^{-m}$ for a particular orthogonal component of p(k), then modulo value $2(2^{-m})$ is subtracted an integral number of times from that component of p(k) until the result is less than or equal to $2^{-m}$. The number of subtractions is counted by incrementing a respective x or y counter. If the output of the FIR filter is negative and less than or equal to $-2^{-m}$ for a particular orthogonal component of p(k), then modulo value $2(2^{-m})$ is added an integral number of times to that component of p(k) until the result is greater than or equal to $-2^{-m}$. The number of additions is counted by decrementing the respective x or y counter. The counters are arithmetic base 4; that is, decrementing two-bit value 00 by 1 produces two-bit value 11, and incrementing two-bit value 11 by 1 produces two-bit value 00. These counts are provided to trellis enhancer 52 via lines x-cnt and y-cnt. The portion of signal p(k) that remains after these subtractions/additions is provided to summer 58 as signal d(k). Signal d(k) is called the dither signal. After performing these calculations, trellis enhancer 52 uses x-cnt, y-cnt and bits $Y_0$ through $Y_n$ to substitute constellation subsets in accordance with Table 2. (For 4-way partitioned constellations, upper and lower case versions of the same letter are considered identical and only the first four columns of Table 2 are necessary.) The resulting output from mux 48 is sent to summer 58 where value d(k) is subtracted to produce signal x(k). This signal is provided to modulator 60, filter 62 and hybrid 64 in a conventional manner.

The count of additions or subtractions is computed independently for each orthogonal axis of the output from filter 66. The counts can be maintained using arithmetic base 4 for 8-way partition constellations and arithmetic base 2 for 4-way partition constellations. These counts are used by the trellis enhancer 52 to perform the substitutions in accordance with Table 2.

When using large symbol constellations, a larger dither signal is tolerable because the larger dither signal reduces error propagation in the receiver's reconstruction filter. In order to accommodate a variety of constellations it may be desirable to use a variable modulo device. A variable modulo device performs similarly to modulo device 54 with the following differences. If the output of the FIR filter is positive and greater than $K2^{-m}$ for a particular orthogonal component of p(k), then modulo value $2K(2^{-m})$ is subtracted an integral number of times from that component of p(k) until the result is less than or equal to $K2^{-m}$. The number of subtractions is counted by incrementing a respective x or y counter K times the number of subtractions. If the output of the FIR filter is negative and less than or equal to $-K2^{-m}$ for a particular orthogonal component of p(k), then modulo value $2K(2^{-m})$ is added an integral number of times to that component of p(k) until the result is greater than or equal to $-K2^{-m}$. The number of additions is counted by decrementing the respective x or y counter K times the number of additions. The variable K is an integer that is greater than 1 for large constellations and equal to 1 for small constellations.

With regard to the value $2^{-m}$, and in reference to FIG. 4, the spacing between symbols is shown to be $2\times 2^{-m}$. The value $2^{-m}$ is an arbitrary scaler where m is preferably an integer such as 7 or 8.

Figure 9:
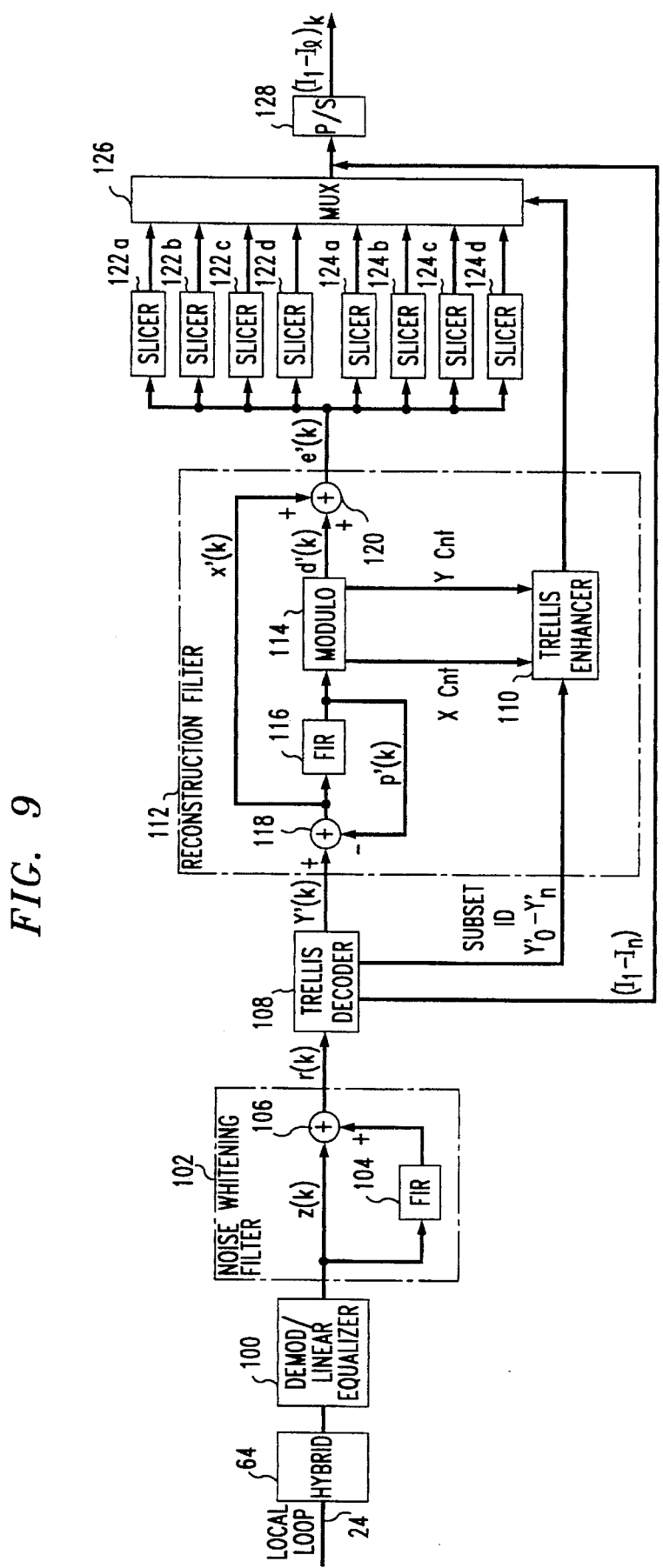
FIG. 9 illustrates the receiver section of one embodiment of the present invention.

FIG. 9 illustrates a receiver that is used with the present invention. A signal is received from local loop 24 through hybrid 64. The receive signal then passes through linear equalizer 100. Demodulator/linear Equalizer 100 is well known in the industry. The signal then passes into noise whitening filter 102. Noise whitening filter 102 compensates for colored noise that is introduced by the communication channel. It is desirable to have white noise so that the trellis code can be successfully decoded. Noise whitening filter 102 comprises three-tap FIR filter 104 and summer 106. FIR filter 104 is well known in the industry and has the same tap values as FIR filter 66 in the remote transmitter of FIG. 3. The whitened signal r(k) is fed to trellis decoder 108. Trellis decoder 108 executes the well known Viterbi algorithm to recover the trellis code and bits $I_1$–$I_n$. The recovered trellis code is used to identify the transmitted constellation subset. This information is supplied to enhancement unit 110 of reconstruction filter 112. Trellis enhancement unit 110 also receives the x-cnt and y-cnt outputs of modulo device 114.

The output of trellis decoder 108 is signal y'(k) and represents a signal having an expanded number of symbols or signal points that extend beyond the constellation of FIG. 4. Constellation expansion is a result of noise whitening filter 102 and its complementary filter and modulo device in the remote transmitter. To eliminate this expansion, FIR filter 116 and summer 118 operate to perform the inverse of noise whitening filter 102. The coefficients of 3 tap FIR filter 116 are the same as FIR filters 104 and 66 in the remote transmitter. The output of FIR filter 116 is labeled p'(k) and is fed to modulo device 114. Modulo device 114 operates in the same manner as the remote modulo device 54. As was described with regard to modulo device 54, modulo device 114 produces signals x-cnt and y-cnt. The output of modulo device 114 is signal d'(k) which is an estimate of signal d(k). Signal d'(k) is combined with signal x'(k) from summer 118 in summer 120. The output of summer 120 is signal e'(k). The output of summer 120 is fed to slicers 122a, b, c and d, and slicers 124a, b, c and d. Slicers 122a, b, c and d and slicers 124a, b, c and d are used to determine which symbol of constellation subsets a, b, c, d, and A, B, C and D, respectively, are represented by signal e'(k). Mux 126 is used to select the output of one of the aforementioned slicers. Mux 126 is controlled using trellis enhancement unit 110. Trellis enhancement unit 110 uses the bits $Y'_0$–$Y'_n$ to identify the transmitted constellation subset, and inputs x-cnt and y-cnt of modulo device 114 are used in accordance with Table 2 to identify the original constellation subset that was replaced with the transmitted subset. Once the original subset has been identified, the slicer associated with that subset is selected using mux 126. The output of mux 126 is then fed to parallel-to-serial converter 128 to recover the originally provided data stream.

Figure 10:
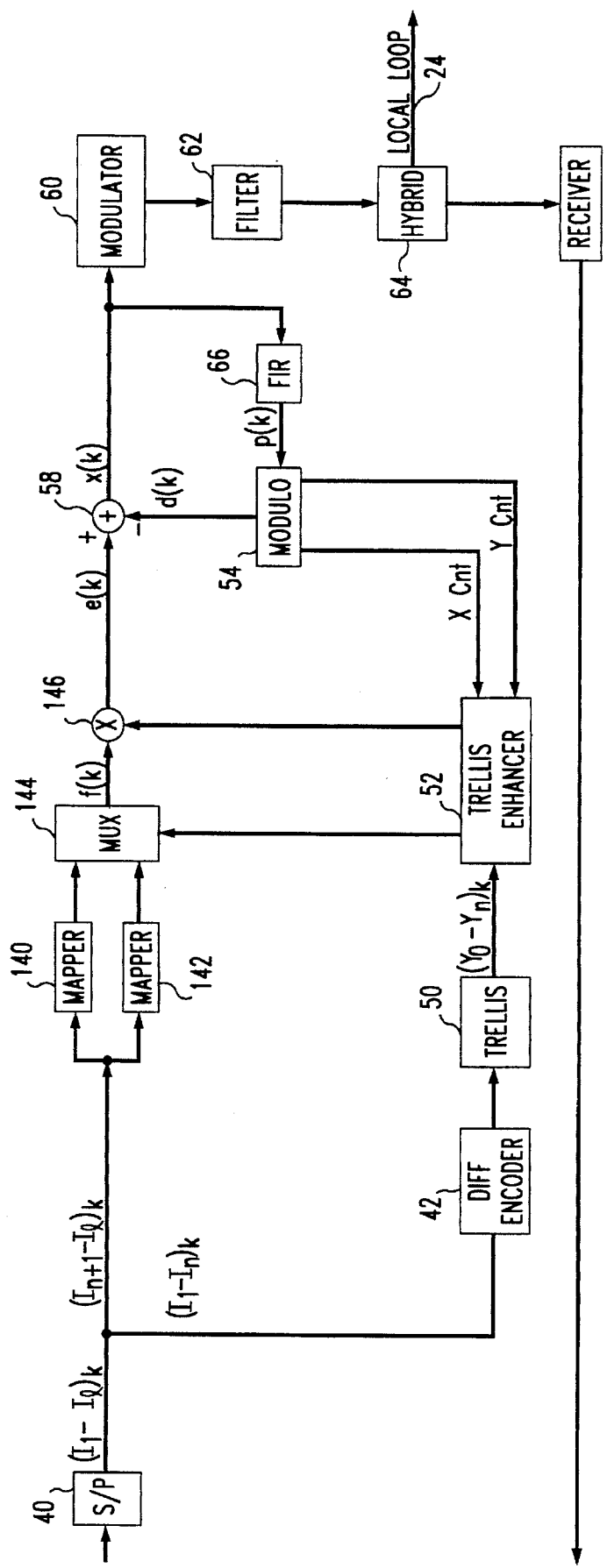
FIG. 10 illustrates the transmitter section of another embodiment of the present invention.

FIG. 10 illustrates an alternative embodiment for selecting substitute constellation subsets in the transmitter. In this embodiment mappers 44a, b, c, d and 46a, b, c, d are replaced with mappers 140 and 142. Each mapper maps signal containing bits $I_{n+1}$ to $I_1$ into a constellation subset. In this embodiment, there are eight constellation subsets that are grouped into two groups of four. In each group of four, the constellation subsets are rotationally related to each other by 90 degree phase shifts. As a result, by selecting the output of mapper 140 or 142, mux 144 selects one of the two groups of four subsets. A particular subset within a group of four is selected through the use of multiplier 146. The subset from mux 144 can be rotated by 0, 90, 180 or 270 degrees to produce any one of the four subsets associated with each mapper. As a result, trellis enhancement device 52 has two outputs, one output selects between mapper 140 and 142 using mux 144, and the other output indicates to multiplier 146 that a 0, 90, 180 or 270 degree phase shift should be initiated. This operation provides the advantage of using a smaller number of mappers as compared to the embodiment of FIG. 3.

Figure 11:
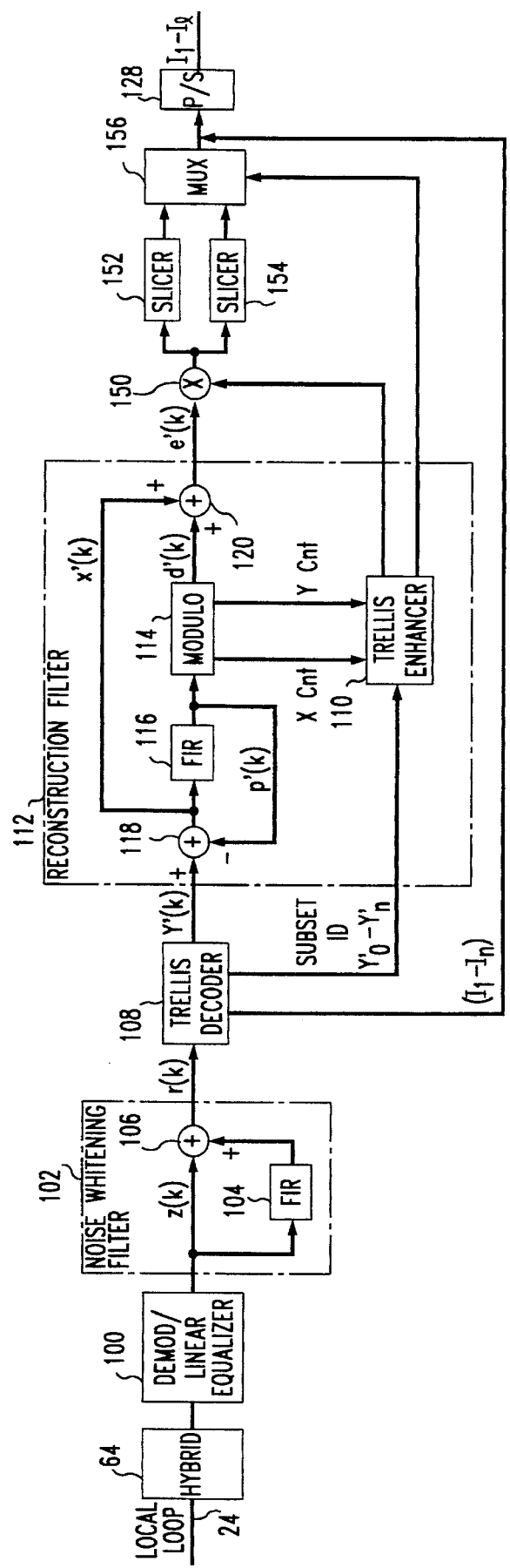
FIG. 11 illustrates the receiver section of another embodiment of the present invention.

In a similar manner, FIG. 11 illustrates an alternative embodiment of the receiver shown in FIG. 9. Signal e'(k) is received by multiplier 150, the output of multiplier 150 is fed to slicers 152 and 154. The output of slicers 152 and 154 are selected using mux 156. Trellis enhancement unit 110 provides inputs to multiplier 150 and mux 156. As discussed with regard to FIG. 9, trellis enhancement unit 110 uses the received subset identity from trellis decoder 108, and the x-cnt and y-cnt inputs from modulo device 114 to identify the original constellation subset. As discussed with regard to FIG. 10, multiplier 150 is used to rotate the received symbol by 0, 90, 180 or 270 degrees to reverse the effect of multiplier 146. Mux 156 is used to pick the appropriate slicer output to recover the original data.

Figure 12:
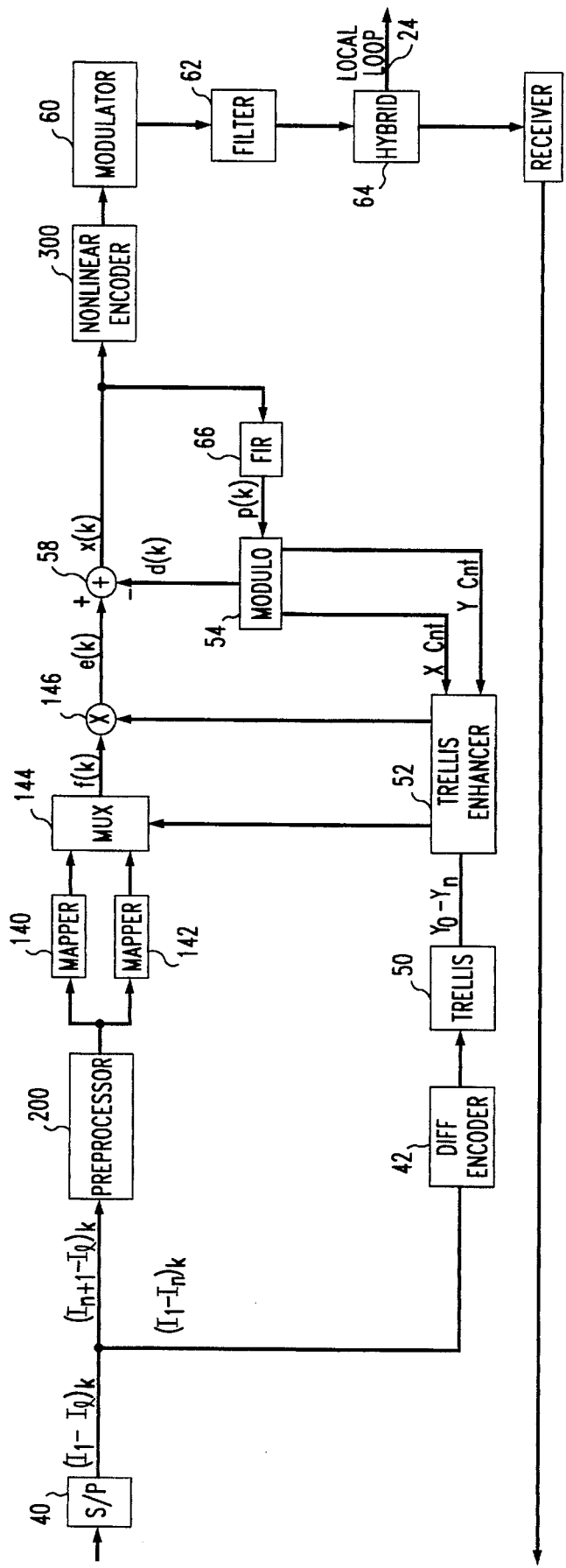
FIG. 12 illustrates the transmitter section of the present invention with a non-linear encoder.
Figure 13:
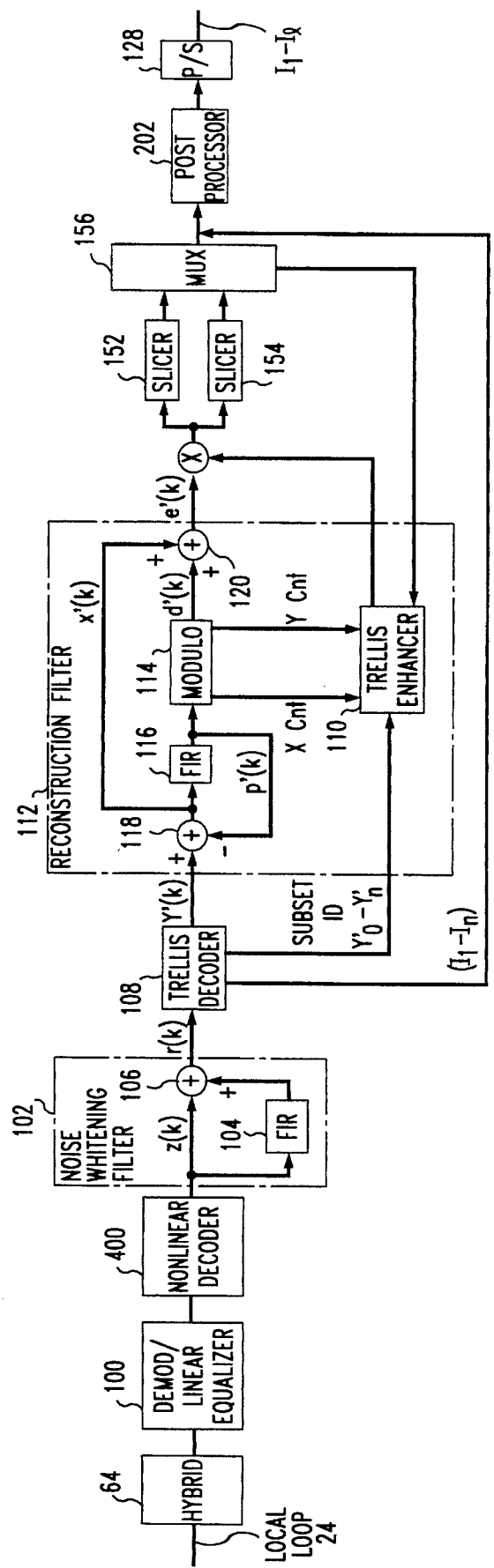
FIG. 13 illustrates the receiver section of the present invention with a non-linear decoder.

FIGS. 12 and 13 illustrate another embodiment of the present invention. With regard to FIG. 12, the transmitter is modified by placing preprocessing unit 200 between serial-to-parallel converter 40, and mappers 140 and 142. The processor can be used to perform functions such as fractional rate encoding, modulus conversion, shaping by rings, and constellation switching. Additionally, the output of summer 58 is fed to non-linear encoder 300 before being passed to modulator 60.

With regard to FIG. 13, the receiver has been modified to include non-linear decoder 400 between demodulator/linear equalizer 100 and noise whitening filter 102. Non-linear decoder 400 compensates for the action of non-linear encoder 300. In addition, post-processing unit 202 is placed between mux 156 and parallel-to-serial converter 128. Post-processing unit 202 forms the inverse of preprocessing unit 200.

The non-linear encoder compensates for non-linear characteristics of the transmission channel. The non-linear encoder warps the constellation by adjusting the positions of its signal points in accordance with a warp function which models the inverse of that component of the non-linear characteristic of the transmission channel which is known a priori. In the case of a PCM system, for example, that component is typically a logarithmic function of the magnitude of the signal being transmitted—the so-called μ-law characteristic. Thus, an inverse logarithmic function, i.e., an exponential function, of the magnitude of the transmitted signal is used to warp the constellation.

Because the constellation warping is deterministic, it is possible for the receiver to "unwarp" the received signal points prior to applying them to the Viterbi decoder using the inverse of the warp function and thereby modeling the known non-linear component of the channel characteristic. (In the case of a PCM system, the inverse function is the inverse of the μ-law characteristic and is, more particularly, a logarithmic function.) As a result, the Viterbi decoder can use the standard, unmodified Viterbi decoding algorithm.

Figure 14:
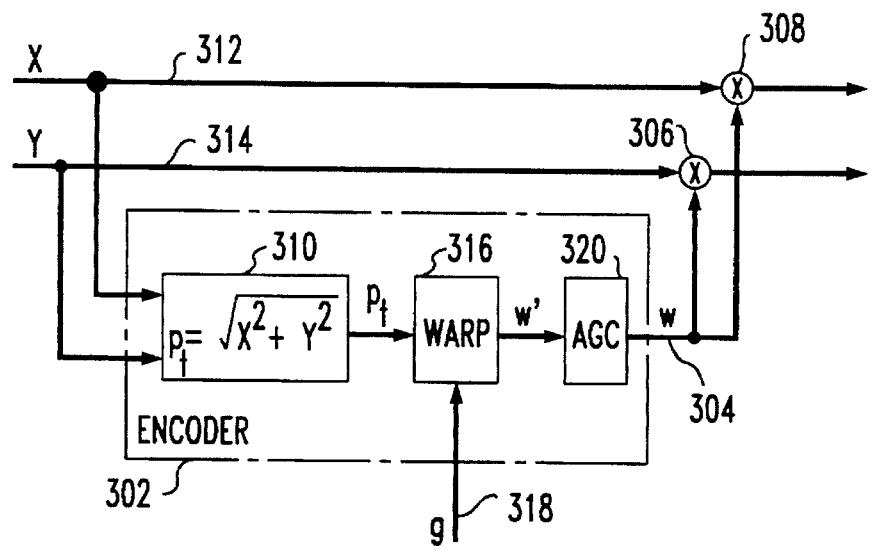
FIG. 14 is a block diagram of the non-linear encoder.

In reference to FIG. 14, the X and Y orthogonal values in signal x(k) are warped by being multiplied by a warp multiplier w generated in accordance with a selected warp function. Specifically, the warp multiplier is generated by encoder 202, which provides it on lead 304 to multipliers 306 and 308. The latter carry out the aforementioned multiplication and the resulting warped values are applied to modulator 60 which, in standard fashion, generates a modulated line signal representing the stream of warped signal points.

It is presumed that the communication channel includes a PCM system so that the overall channel characteristic has a known non-linear component which is a function of instantaneous signal magnitude, that function being the μ-law characteristic. Accordingly, the warp function used by encoder 302 to generate warp multiplier w is a function of the signal magnitude of the transmitted signal points. That is, the magnitude is an independent variable in the warp function. To this end, encoder 302 includes magnitude computer 310, which receives the X and Y values from leads 312 and 314 and determines the magnitude $p_t$ of each signal point by computing the value $p_t = \sqrt{X^2 + Y^2}$. That value of $p_t$ is then applied to warp generator 316, which receives a warp factor g on lead 318 from within the modem or communication device. This factor—which is another independent variable in the warp function—is selected as a function of the degree to which it is desired to warp the overall signal constellation which, in turn, is a function of the known component of the non-linear characteristic of the channel—in this case, the μ-law characteristic. In the present illustrative embodiment, warp generator 316 generates a preliminary warp multiplier w' in accordance with the warp function $$w' = 1 + (8192 P_t + 2731 P_t^2 + 683 P_t^3 + 137 P_t^4 + 23 P_t^5 + 3 P_t^6)/16384$$

where $P_t = p_t/g$.

This relation is a series approximation to the (exponential) inverse of the μ-law characteristic $$w = \frac{e^{P_t} - 1}{P_t}$$

Moreover, where a different non-linear relationship obtains in the channel, a different inverse of that function would be used by warp generator 316. For example, if the channel includes an ADPCM system, where the signal processing algorithm changes over time, as a function of signal magnitude, then the value of g used by warp generator 316 would be adapted in such a way as to model the inverse of that algorithm. The function used by the warp generator could also take into account how one expects noise in the channel to differently affect low- and high-magnitude signal points of the constellation.

Depending on the value of warp factor g and the range of values for $p_t$, it may be the case that multiplying preliminary warp multiplier w' by X and Y would result in warped signal points that cause the peak and/or average power limits of the channel to be exceeded. Accordingly, preliminary warp multiplier w' is processed within encoder 302 by automatic gain control (AGC) 320 to generate the aforementioned warp multiplier w on lead 304. The AGC has a very long time constant, thereby providing a scaling function which, after an adaptation period, will be essentially constant for any given constellation and warp factor g. This serves to impose an upper limit on the value of warp multiplier w which avoids any exceeding of the channel power limits.

Figure 15:
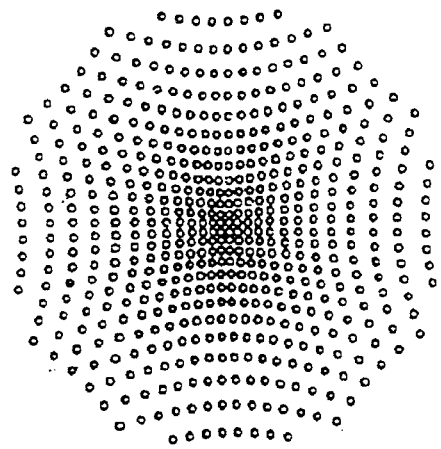
FIGS. 15–17 illustrate warped constellations with different values for g.
Figure 16:
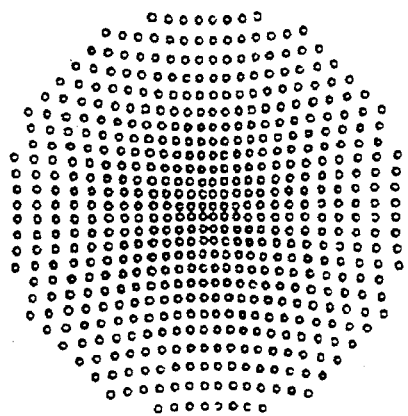
Figure 17:
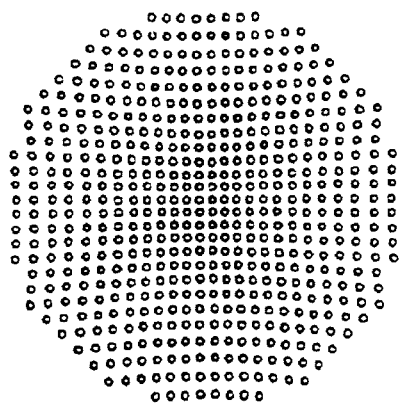
Figure 18:
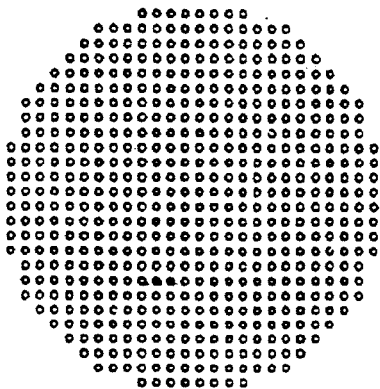
FIG. 18 illustrates an unwarped constellation.

FIGS. 15–17 show the warped versions of the constellation of FIG. 18 that result from the warping just described using different values of warp factor g. The particular value of warp factor g that is used will depend on the application and may be determined empirically. In any case, it will be appreciated that each of the warped signal points of the constellation of FIGS. 15–17 are related to a respective signal point of the base constellation of FIG. 18 in accordance with a predetermined warp function.

Figure 19:
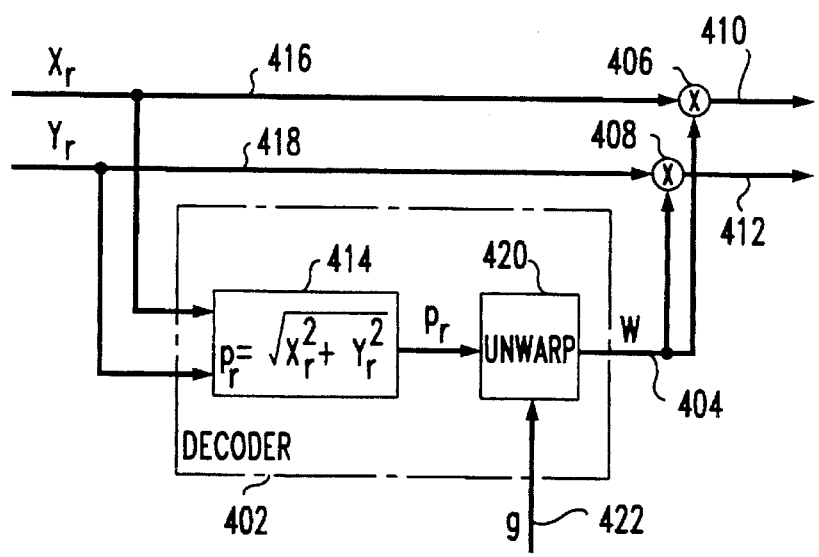
FIG. 19 is a block diagram of the non-linear decoder.

Turning, now, to the receiver of FIG. 13, and in reference to FIG. 19, the signal from demodulator/linear equalizer 100 represents the demodulator/equalizer's best estimate of the in-phase and quadrature-phase components of the transmitted signal points, designated $X_r$ and $Y_r$, the subscript "r" denoting "receiver." These components are "unwarped," by non-linear decoder 400 by multiplying them by an unwarping multiplier W. Specifically, that multiplier is generated by decoder 402, which provides multiplier W on lead 404 to multipliers 406 and 408 in a manner described below. Multipliers 406 and 408 carry out the aforementioned multiplication, and the resulting unwarped in-phase and quadrature-phase values on leads 410 and 412 are applied to noise whitening filter 102.

Referring to decoder 402, its job is to determine the value of $p_r$ of the received signal points and, armed with a knowledge of the value of warp factor g, to perform the inverse of the warping that was undertaken in the transmitter. Thus, decoder 402 includes magnitude computer 414, which computes the value of $p_r$ from the received $X_r$ and $Y_r$ values on leads 416 and 418, and unwarp generator 420 which, responsive to the value of warp factor g on lead 422, generates unwarp multiplier W in accordance with the relation $$W=1+(-8192P_r+5461P_r^2-4096P_r^3+3277P_r^4-2731P_r^5+2341P_r^6)/16384$$

where $P_r=p_r/g$.

This is the inverse of the relation by which preliminary warp multiplier w' was generated and is a series approximation—usable for $P_r<1$—to the (logarithmic) μ-law characteristic $$W=\frac{\ln(1+P_r)}{P_r}.$$

For $P_r \geq 1$, a different approximation would be used.

Note that the value of the magnitude $p_r$ that is used in the expression for unwarp multiplier W is the value computed from the received signal points. This value of $p_r$ will typically be at least a little different from the value used to generate warp multiplier w in the transmitter owing to the noise component superimposed on the received signal points. This means that the amount by which a point is unwarped will be slightly different than the amount by which it was warped. Advantageously, however, this difference will tend to bring the signal points, upon being unwarped, into tighter loci about their corresponding positions in the base constellation than if, for example, the unwarping were to be carried out employing the value of $p_t$ used in the transmitter (assuming that value could, in fact, be made known to, or could be computed in, the receiver).

The foregoing relates to noise that was superimposed on the transmitted signal points after the μ-law encoding in the channel has been carried out. However, at the point in time that they are subjected to the μ-law encoding in the channel, the transmitted signal points have already been somewhat perturbed due to noise and other channel effects occurring between the transmitter and the codec within the channel in which the μ-law encoding is actually carried out. Thus the warped signal points are not warped from the ideal signal point positions of FIG. 18, but rather from positions that are just a little bit displaced therefrom. Using the inverse of the μ-law characteristic in the receiver does not take account of this. The effect is very minor, so that the approach described hereinabove does work quite well. It is, however, possible to take account of that effect, thereby providing results that are even better.

In particular, it is known that, in the absence of warping, the noise associated with each received signal point—due to the non-linear A/D converter in a PCM system—may be closely represented by an equation of the form $$n=\sqrt{a^2p^2+b^2}$$

where n is the root-mean-square (r.m.s.) value of the noise associated with a signal point of magnitude p. The constants a and b depend upon the properties of the communication channel and the transmit and receive filters.

In situations, such as that postulated here, in which the transmission channel superimposes multiplicative noise onto the received signal points, it is advantageous for the warp function and its inverse to be such that, upon warping, the distance between adjacent signal points is proportional to the r.m.s. noise associated with those points. As a result, the noise superimposed on each received signal point is independent of its position in the constellation and the difference of error probabilities associated with different signal points is minimized. If the constellation contains a large number of signal points, this property is achieved by a warp function $$w'=1+(2731P_t^2+137P_t^4+3P_t^6)/16384$$

where $P_t=p_t/g$ and $g=b/a$.

This relation is a series approximation to a hyperbolic sine function $$w=\frac{\sinh P_t}{P_t}.$$

Since the value of a and b are dependent on the communication channel and are generally not known a priori, g may be adapted as before, or may be calculated from measurement of the received noise so as to determine the ratio b/a.

The corresponding receiver unwarp multiplier is generated according to the relation $$W=1+(-2731P_r^2+1229P_r^4-731P_r^6)/16384$$

which is a series approximation to the inverse hyperbolic sine function $$W=\frac{\ln(P_r+\sqrt{1+P_r^2})}{P_r}=\frac{\sinh^{-1}P_r}{P_r}$$

valid for $P_r<1$.

After the unwarping operation is carried out, the original constellation with equal spacing of signal points is approximately restored, with approximately equal noise power associated with each signal point.

The foregoing merely illustrates the principles of non-linear encoding/decoding. Thus, although logarithmic and sinh functions are discussed herein, other functions may be advantageous in particular circumstances.

In a simple implementation, warp factor g can be pre-set in the transmitter and receiver based on the expected characteristics of the channel. In a more sophisticated application, one might adaptively determine g by having the receiver examine the dispersion of the received signal points about the expected signal points and then use that measurement to adapt the value of g in the receiver while making that value known to the transmitter via, for example, conventional diagnostic channel communications between the two modems or communication devices.

Although the various functional blocks of the transmitter and receiver are shown for pedagogic clarity as individual discrete elements, the functions of those blocks could and, with present technology, typically would be carried out by one or more programmed processors, digital signal processing (DSP) chips, etc., as is well known to those skilled in the art.

The invention is disclosed in the context of a system using two-dimensional constellations. However, it is equally applicable to systems using constellations of any dimensionality, as will be well appreciated by those skilled in the art.

It is also important to note that the invention is not limited to modem technology but rather to any type of signal transmission system and/or environment in which inter-symbol intereference and/or deterministic, non-linear effects are present.

Thus it will be appreciated that many and varied arrangements may be devised by those skilled in the art which, although not explicitly shown or described herein, embody the principles of the invention and are thus within its spirit and scope.

I claim:

1. A method of transmitting data from a transmitter to a receiver over a communication channel, comprising the steps of:
   generating a first signal using an output from a filter that receives prior transmitted signal points as inputs;
   selecting a subset of a predefined signal point constellation based on at least one bit of a data word and a modulo count derived by counting modifications made to an amplitude of said signal, said modifications resulting in said amplitude being between an upper predetermined threshold and a lower predetermined threshold;
   selecting a signal point in said subset based on at least one bit of said data word; and
   transmitting a second signal representative of said signal point over the communication channel.

2. The method of claim 1, wherein said step of selecting said subset comprises using an output of a state machine that enters one of a plurality of predefined states, a current state of said state machine being a function of at least one bit of said data word and a prior state of said state machine.

3. The method of claim 2, wherein said state machine produces a trellis code.

4. The method of claim 2, wherein said state machine produces a differential code.

5. The method of claim 2, wherein said state machine remains in one state for at least two signal point periods.

6. The method of claim 1, wherein said modulo count comprises conducting a separate modulo count on each orthogonal component of said signal.

7. The method of claim 1, wherein a variable modulo value is used to produce said modulo count.

8. The method of claim 1, further comprising adding a dither signal to a third signal representative of said signal point to produce said second signal representative of said signal point.

9. The method of claim 8, wherein said dither signal comprises orthogonal components X and Y, where $-2^{-m} \leq X \leq 2^{-m}$, $-2^{-m} \leq Y \leq 2^{-m}$, and $2(2^{-m})$ is the distance between adjacent signal points in said signal point constellation.

10. The method of claim 9, wherein m is an integer.

11. A method of transmitting data from a transmitter to a receiver over a communication channel, comprising the steps of:
    identifying a first subset of a predefined signal point constellation based on at least one bit of a data word;
    generating a signal using an output from a filter that receives prior transmitted signal points as inputs;
    selecting a second subset of said predefined signal point constellation based on said first subset and a modulo count derived by counting modifications made to an amplitude of said signal, said modifications resulting in said amplitude being between an upper predetermined threshold and a lower predetermined threshold, said second subset having a signal point selected based on at least one bit of said data word; and
    transmitting a second signal representative of said signal point over the communication channel.

12. The method of claim 11 wherein said step of identifying a first subset comprises using an output of a state machine that enters one of a plurality of predefined states, a current state of said state machine being a function of at least one bit of said data word and a prior state of said state machine.

13. The method of claim 12, wherein said state machine produces a trellis code.

14. The method of claim 12, wherein said state machine produces a differential code.

15. The method of claim 12, wherein said state machine remains in one state for at least two signal point periods.

16. The method of claim 11, wherein said subsets are rotationally related.

17. The method of claim 11, wherein said modulo count comprises conducting a separate modulo count on each orthogonal component of said signal.

18. The method of claim 11, wherein a variable modulo value is used to produce said modulo count.

19. The method of claim 11, further comprising adding a dither signal to a third signal representative of said signal point to produce said second signal representative of said signal point.

20. The method of claim 19, wherein said dither signal comprises orthogonal components X and Y, where $-2^{-m} \leq X \leq 2^{-m}$, $-2^{-m} \leq Y \leq 2^{-m}$, and $2(2^{-m})$ is the distance between adjacent signal points in said signal point constellation.

21. The method of claim 20, wherein m is an integer.

22. A method of transmitting data from a transmitter to a receiver over a communication channel, comprising the steps of:
    identifying a first subset of a predefined signal point constellation based on at least one bit of a data word;
    generating a signal using an output from a filter that receives prior transmitted signal points as inputs;
    selecting a second subset of said predefined signal point constellation based on said first subset and a modulo count derived by counting modifications made to an amplitude of said signal said modifications resulting in said amplitude being between an upper predetermined threshold and a lower predetermined threshold, said second subset having a signal point selected based on at least one bit of said data word;
    modifying an amplitude of at least one orthogonal component of a second signal representative of said signal point to form a modified signal point, said modification being a function of said signal point's position in said constellation; and
    transmitting a third signal representative of said modified signal point over the communication channel.

23. The method of claim 22, wherein said step of identifying a first subset comprises using an output of a state machine that enters one of a plurality of predefined states, a current state of said state machine being a function of at least one bit of said data word and a prior state of said state machine.

24. The method of claim 23, wherein said state machine produces a trellis code.

25. The method of claim 23, wherein said state machine produces a differential code.

26. The method of claim 23, wherein said state machine remains in one state for at least two signal point periods.

27. The method of claim 22, wherein said modulo count comprises conducting a separate modulo count on each orthogonal component of said signal.

28. The method of claim 22, wherein a variable modulo value is used to produce said modulo count.

29. The method of claim 22, further comprising adding a dither signal to a fourth signal representative of said signal point to produce said second signal representative of said signal point.

30. The method of claim 29, wherein said dither signal comprises orthogonal components X and Y, where $-2^{-m} \leq X \leq 2^{-m}$, $-2^{-m} \leq Y \leq 2^{-m}$, and $2(2^{-m})$ is the distance between adjacent signal points in said signal point constellation.

* * * * *